(12) United States Patent
Sato

(10) Patent No.: US 8,270,015 B2
(45) Date of Patent: Sep. 18, 2012

(54) RECEIVING A COLOR IMAGE AND TRANSFERRING THE RECEIVED COLOR IMAGE TO ANOTHER APPARATUS

(75) Inventor: Hideo Sato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 973 days.

(21) Appl. No.: 12/273,834

(22) Filed: Nov. 19, 2008

(65) Prior Publication Data

US 2009/0153898 A1   Jun. 18, 2009

(30) Foreign Application Priority Data

Dec. 13, 2007   (JP) .................................. 2007-322542

(51) Int. Cl.
*G06F 3/12* (2006.01)
(52) U.S. Cl. ...................................................... 358/1.15
(58) Field of Classification Search .................. 358/1.15
See application file for complete search history.

(56) References Cited

U.S. PATENT DOCUMENTS

| | | | |
|---|---|---|---|
| 5,481,249 A | 1/1996 | Sato | 340/825.06 |
| 6,043,902 A | 3/2000 | Sato | 358/434 |
| 6,047,288 A | 4/2000 | Kurosawa et al. | 707/9 |
| 6,286,034 B1 | 9/2001 | Sato et al. | 709/204 |
| 7,933,054 B2 * | 4/2011 | Fujioka | 358/540 |
| 2003/0193692 A1 | 10/2003 | Matsuyama | |
| 2006/0187475 A1 | 8/2006 | Fujioka | 358/1.9 |

FOREIGN PATENT DOCUMENTS

| | | |
|---|---|---|
| JP | 6-38053 A | 2/1994 |
| JP | 10-51616 A | 2/1998 |
| JP | 2003-069837 A | 3/2003 |
| JP | 2003-152928 A | 5/2003 |
| JP | 2003-304406 A | 10/2003 |
| JP | 2006-217545 A | 8/2006 |

* cited by examiner

*Primary Examiner* — Benny Q Tieu
*Assistant Examiner* — Eric A Rust
(74) *Attorney, Agent, or Firm* — Fitzpatrick, Cella, Haper & Scinto

(57) ABSTRACT

An image processing apparatus enables a user to widely select a desired transfer method, in relation to methods of transferring image data to be output to a transfer destination. To accomplish this, the image processing apparatus allows the user to set instruction information for instructing a transfer method of image data, and decides on a transfer method based on the set instruction information if the image data is color data. This transfer method includes a first transfer method of transferring color image data, a second transfer method of converting color image data to monochrome image data and transferring the monochrome image data, and a third transfer method of storing color image data in a storage unit and transmitting a report showing that image data has been received to a transfer destination printer.

12 Claims, 15 Drawing Sheets

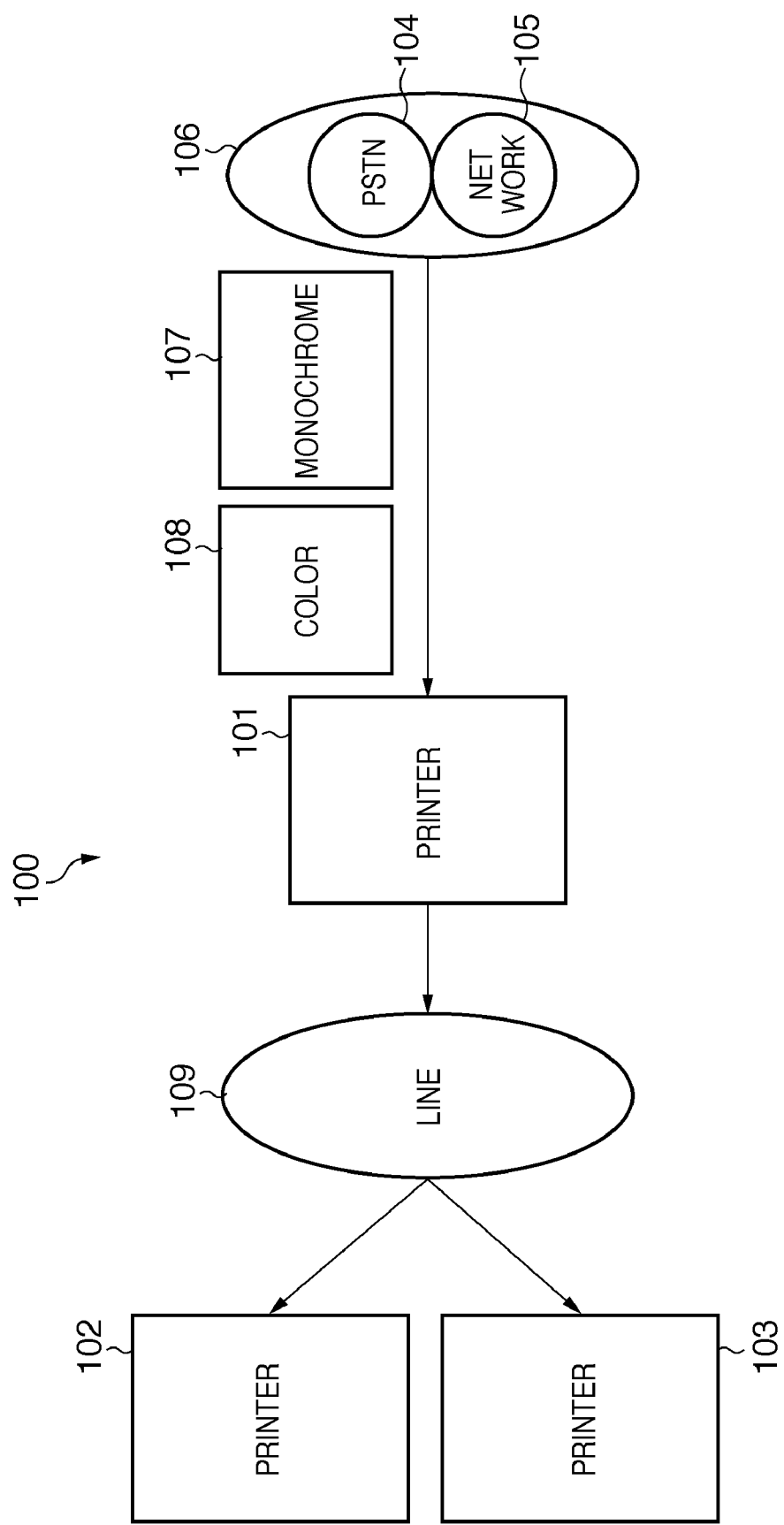

- COLOR IMAGE RECEIVED

- RECEIVER: TRANSFER SOURCE APPARATUS 1

- DOCUMENT NO.: 8910

P.1 (REDUCED IMAGE)

FIG. 8
- COLOR IMAGE RECEIVED
- RECEIVER: TRANSFER SOURCE APPARATUS 1
- DOCUMENT NO.: 8910
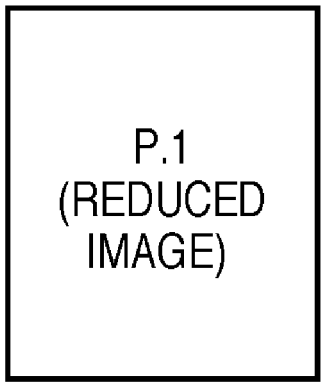
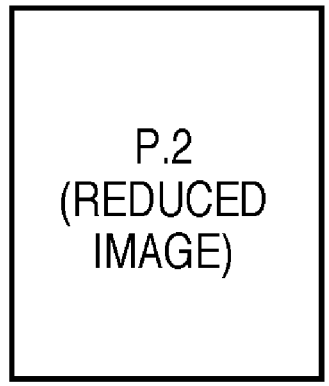
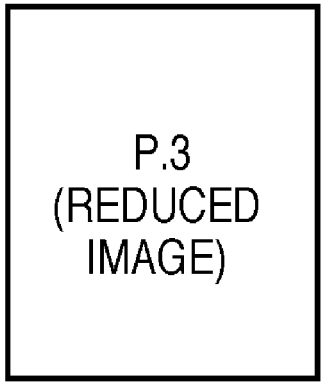
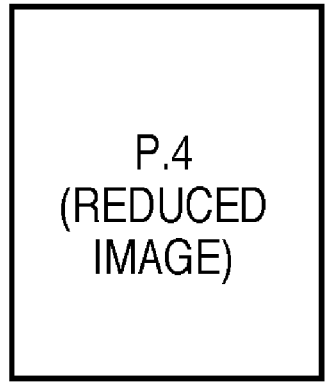

RECEIVING A COLOR IMAGE AND TRANSFERRING THE RECEIVED COLOR IMAGE TO ANOTHER APPARATUS

BACKGROUND OF THE INVENTION

1. Field of the Invention

The present invention relates to an image processing apparatus that receives a color image and transfers the received image to another apparatus, a control method thereof, and a computer program.

2. Description of the Related Art

Currently, with fax communication, a transmission source telephone number, an F-code, a password and the like are handled as part of the fax communication procedure. This information is received and decoded by a transfer source apparatus. The transfer source apparatus checks the received transmission source telephone number, F-code and password with the transfer setting content set in the transfer source apparatus, and transfers a fax image to the transfer destination according to the check result. Further, with network communication utilizing Internet technology or the like, the communication data includes a transfer instruction command, transfer source information and transfer destination information. This information is received and decoded by the transfer source apparatus. The transfer source apparatus transfers the image data to a transfer destination in accordance with the instruction command. FIG. 10 shows the flow of data when transferring image data.

In FIG. 10, color image data 1008 and monochrome image data 1007 are transmitted via a communication line 1006 that includes a public line PSTN 1004 and a network 1005, and received by a transfer source apparatus 1001. The transfer source apparatus 1001 transfers the image data to a transfer destination apparatus A 1002 or a transfer destination apparatus B 1003 via a communication line 1009, according to the above transfer settings and transfer instruction command.

In the case where the communication image is a color image and the transfer source apparatus has the capability to receive and print color images, color image data will be transmitted by fax or over the network. However, the transfer destination apparatus does not always have the capability to receive or the capability to print color images. That is, the transfer destination apparatus may only be able to receive monochrome images. Or the transfer source apparatus may only be able to print in monochrome, despite having the capability to receive color images.

Japanese Patent Application Laid-Open No. 2006-217545 proposes a technique for receiving a color image and printing in monochrome after converting the color image to monochrome in the case where the received data is a color image. Further, in this document, a technique is proposed for holding the received color image in a memory and outputting the color image if instructed by a user. In Japanese Patent Application Laid-Open No. 2003-69837, a technique is proposed for judging, as a procedure prior to communication, whether the transmission destination can receive a color image, in the case where the received data is a color image, and converting the color image to a monochrome image and transmitting the monochrome image if reception of a color image is not permitted.

FIG. 11 shows an example in which the configuration of Japanese Patent Application Laid-Open No. 2006-217545 is applied to the case where a color image is transferred to another apparatus from an apparatus capable of receiving color images. In this case, the transfer source apparatus 1001 converts the color image to a monochrome image regardless of the capability of the transfer destination apparatus A 1002 and the transfer destination apparatus B 1003, and transfers the monochrome image. The transfer destination apparatuses A 1002 and B 1003 thereby output monochrome printed materials 1101, 1102, 1103 and 1104 irrespective of the type (color image, monochrome image) of source image. The transfer source apparatus 1001 saves all color images in case a color image printing request is notified later. Consequently, with Japanese Patent Application Laid-Open No. 2006-217545, unnecessary monochrome images get output even though the user wants a color image.

FIG. 12 shows an example in which the configuration of Japanese Patent Application Laid-Open No. 2003-69837 is applied to the case where a color image is transferred from an apparatus capable of receiving color images to another apparatus. First, on receiving color image data, the transfer source apparatus 1001 checks the capability of the transfer destination apparatus A 1002 and the transfer destination apparatus B 1003. Here, since color printing is not available in the transfer destination apparatus A 1002, the transfer source apparatus 1001 implements monochrome conversion on the color image data 1008 and transfers a monochrome image. On the other hand, if monochrome image data 1007 is received, the transfer source apparatus 1001 transfers the monochrome image as is. The transfer destination apparatus A 1002 thereby outputs monochrome printed materials 1201 and 1202 irrespective of the type of source image.

On the other hand, since color printing is available in the transfer destination apparatus B 1003, the transfer source apparatus 1001 transfers the color image as is with respect to the color image data 1008, and transfers the monochrome image as is with respect to the monochrome image data 1007. The transfer destination apparatus B 1003 thereby outputs color printed material 1204 if the source image is the color image data 1008, and outputs monochrome printed material 1203 if the source image is the monochrome image data 1007.

Accordingly, with Japanese Patent Application Laid-Open No. 2003-69837, a case arises where only monochrome printing can be executed with respect to the user of the transfer destination apparatus A 1002, despite the source image being color. Further, in the case where the user of the transfer destination apparatus B 1003 wants a monochrome image in order to save on toner even though the source image is a color image, color printing will be executed rather than the desired monochrome printing. Thus, with conventional techniques, there is limited room for the end user to select the type of print output desired relative to the type of source image, since the final printed material is output based on an automatic judgment by the respective apparatus.

SUMMARY OF THE INVENTION

The present invention enables realization of an image processing apparatus that enables a user to widely select a desired transfer method, in relation to methods of transferring image data to be output to a transfer destination.

According to one aspect of the present invention, there is provided an image processing apparatus that receives image data and transfers the received image data to another apparatus, comprising: a setting unit configured to allow a user to set, for each transfer destination of the image data, instruction information for instructing a transfer method of the image data; a storage unit configured to store the set instruction information; a determination unit configured to determine whether the received image data is color image data or monochrome image data; a decision unit configured to decide on a transfer method based on the instruction information stored in the storage unit, when the image data is color image data; and a transfer unit configured to transfer the image data in accordance with the decided transfer method; wherein the transfer method includes a first transfer method of transferring color image data, a second transfer method of converting color image data to monochrome image data and transferring the monochrome image data, and a third transfer method of storing color image data in the storage unit and transmitting a report showing that image data has been received to a transfer destination apparatus.

According to another aspect of the present invention, there is provided a control method of an image processing apparatus that receives image data and transfers the received image data to another apparatus, comprising: allowing a user to set, for each transfer destination of the image data, instruction information for instructing a transfer method of the image data; storing the set instruction information in a storage unit; determining whether the received image data is color image data or monochrome image data; deciding on a transfer method based on the instruction information stored in the storage unit, when the image data is color image data; and transferring the image data in accordance with the decided transfer method; wherein the transfer method includes a first transfer method of transferring color image data, a second transfer method of converting color image data to monochrome image data and transferring the monochrome image data, and a third transfer method of storing color image data in the storage unit and transmitting a report showing that image data has been received to a transfer destination apparatus.

Further features of the present invention will be apparent from the following description of exemplary embodiments with reference to the attached drawings.

BRIEF DESCRIPTION OF THE DRAWINGS

FIG. 1A shows an exemplary image processing system 100 according to a first embodiment.

FIG. 8 shows a report 800 constituting a variation of the report 500.

DESCRIPTION OF THE EMBODIMENTS

Figure 1B:
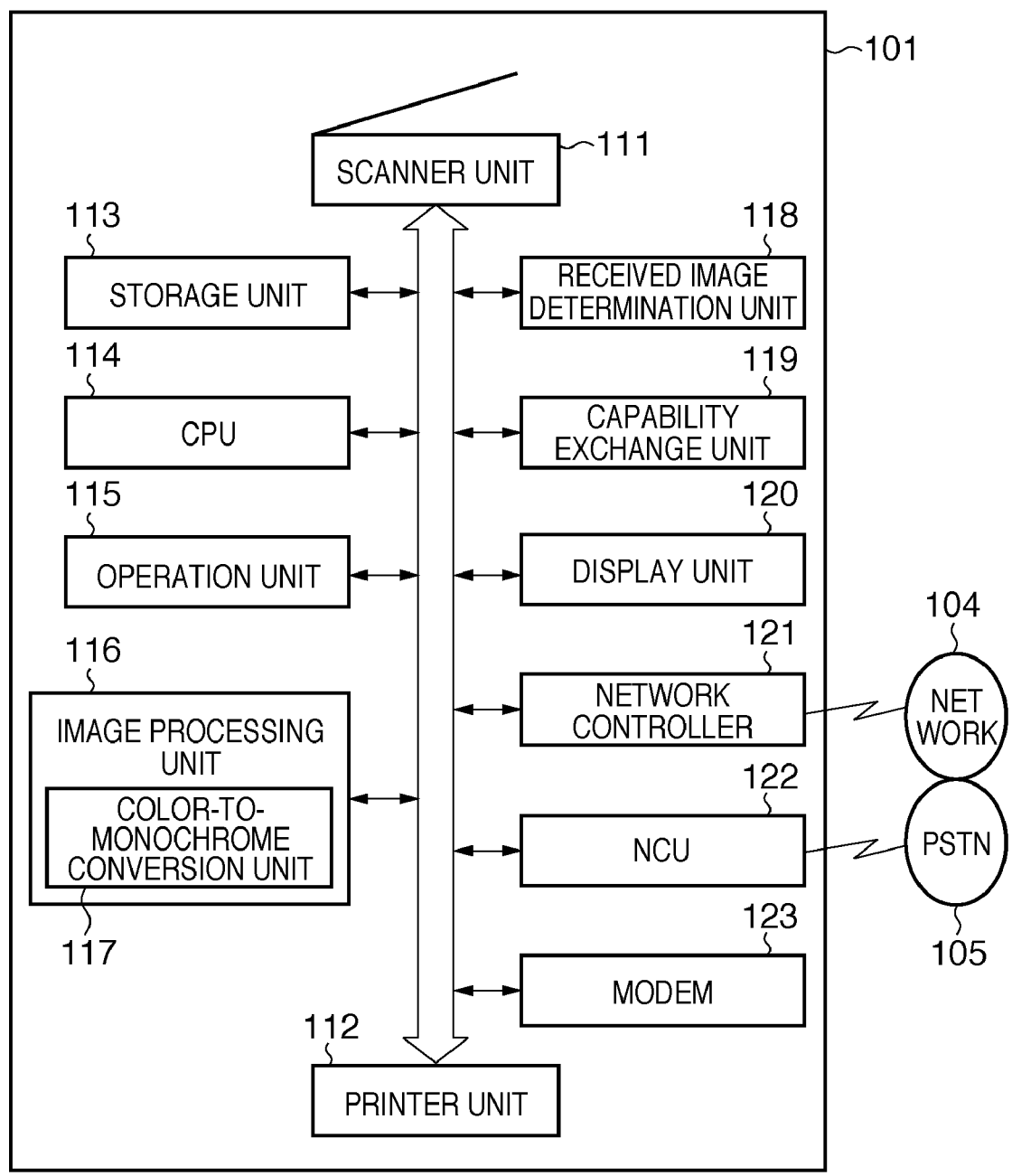
FIG. 1B shows the configuration of a printer 101 according to the first embodiment.

Preferred embodiments of the present invention will now be described in detail with reference to the drawings. It should be noted that the relative arrangement of the components, the numerical expressions and the numerical values set forth in these embodiments do not limit the scope of the present invention unless it is specifically stated otherwise.

First Embodiment

Hereinafter, a first embodiment will be described with reference to FIGS. 1A to 6C. FIG. 1A shows an exemplary image processing system 100 according to the first embodiment. The image processing system 100 is provided with a printer 101 that functions as a transfer source apparatus, printers 102 and 103 that function as transfer destination apparatuses, and other information processing apparatuses (not shown). These apparatuses are connected via communication lines 106 and 109. The communication lines 106 and 109 include a public line PSTN 104 and a network 105.

In the present embodiment, the printer 101 functions as a transfer source apparatus, and is assumed to be a multifunction peripheral serving as an image processing apparatus. Accordingly, the printer 101 receives image data 107 and 108 via the communication line 106, and transfers the received image data 107 and 108 to the printers 102 and 103 functioning as transfer destination apparatuses via the communication line 109. Here, the color image data 108 and the monochrome image data 107 are assumed to be the image data. Image data with a rasterized data format or image data with respect to which color or monochrome has been designated with a code format can be employed, for instance. The printer 101 according to the present embodiment causes this image data to be output with the user's desired method, such as color printing or monochrome printing, for example. The printers 102 and 103 functioning as transfer destination apparatuses execute printing with the method instructed by the transfer source printer 101.

FIG. 1B shows the configuration of the printer 101 according to the first embodiment. Here, the description will focus mainly on characteristic portions of the present embodiment. Accordingly, the printer 101 may be constituted to include other constituent elements.

The printer 101 is provided with a scanner unit 111, a printer unit 112, a CPU 114, a storage unit 113, a modem 123, an NCU 122, a network controller 121, an operation unit 115, a display unit 120, a received image determination unit 118, a capability exchange unit 119, and an image processing unit 116. The image processing unit 116 is provided with a color-to-monochrome conversion unit 117.

The scanner unit 111 functions as a read unit, and has a function of optically scanning and reading an original when the printer 101 executes a copy operation, a fax transmission operation, a scan operation or the like. This scanner unit 111 includes an automatic document feeder (ADF) for automatically feeding and reading an original.

The printer unit 112 is, for example, an electrophotographic printer, and executes printing by transferring suitable toner to a medium such as paper according to an input image signal and thermally fixing the toner. If color printing is available, the printer unit 112 has cyan, magenta, yellow and black multicolor toner, and realizes color printing by mixing these colors. On the other hand, if color printing is not available, the printer unit 112 has monochrome toner and realizes monochrome printing using this toner. Note that the printer unit 112 may employ another system such as an inkjet system or a sublimation system, rather than being limited to an electrophotographic system.

The storage unit 113 is composed of a storage medium such as a ROM, a RAM or a hard disk, and stores operation programs for the printer 101, various image data, information set by the user, and the like.

The CPU 114 performs overall control of the entire apparatus in accordance with the operation programs stored in the storage unit 113. The CPU 114 also functions as a setting unit, a decision unit and a transfer unit in order to execute a transfer process of transferring received image data to another apparatus.

When functioning as a setting unit, the CPU 114 allows the user to set instruction information for instructing a transfer method of image data for each transfer destination (e.g., printers 102, 103) of the image data. The instruction information will be described below. Specifically, the CPU 114 acquires instruction information from the user using the operation unit 115 and the display unit 120. Further, the CPU 114 here functions as a display control unit and an acquisition unit. That is, the CPU 114 displays a setting screen for setting instruction information on the display unit 120, and acquires the setting content input via the setting screen using the operation unit 115. On acquiring the instruction information, the CPU 114 stores the acquired instruction information in the storage unit 113.

When functioning as a decision unit, the CPU 114 decides on a transfer method based on the instruction information stored in the storage unit 113, when the received image data is color image data. Deciding on a transfer method will be described below.

When functioning as a transfer unit, the CPU 114 transfers image data to a transfer destination printer in accordance with the decided transfer method. Here, according to the present embodiment, a first transfer method, a second transfer method and a third transfer method are provided as transfer methods for transferring image data. The first transfer method involves transferring color image data. The second transfer method involves converting color image data to monochrome image data, and transferring the monochrome image data. The third transfer method involves storing color image data in the storage unit 113 and transmitting a report showing that image data has been received to the transfer destination printer.

The modem 123 controls modulation and demodulation of fax communication data. The NCU (network control unit) 122 controls the line connection with an exchange when the printer 101 is connected to a PSTN (public switched telephone network). The network controller 121 is an interface with a network such as the Internet, and controls communication with the network.

The operation unit 115 is an input apparatus for acquiring instructions from the user. The display unit 120 is a display apparatus that is attached to the operation unit 115, and displays various types of information. A touch panel LCD may be used, for example.

The received image determination unit 118 determines whether image data received from the PSTN 104 or the network 105 is color or monochrome.

The capability exchange unit 119 functions as a capability acquisition unit, exchanging information on apparatus capability with connected apparatuses of an equivalent configuration when the printer 101 performs a transfer operation, for instance. Hereinafter, the capability exchange unit 119 is assumed to mainly performing information exchange related to printing capability (e.g., whether color printing is available, etc.), unless expressly stated.

The image processing unit 116 performs image processing on image data handled by the printer 101. For example, the image processing unit 116 performs image processing on an image read by the scanner unit 111, and creates image data to pass to the printer unit 112. The image processing unit 116 is provided with the color-to-monochrome conversion unit 117 as a module constituting a portion thereof. The color-to-monochrome conversion unit 117 converts R (red), G (green) and B (blue) color image data, for example, to a monochrome image. Here, the color image data is not limited to R, G and B.

Figure 2:
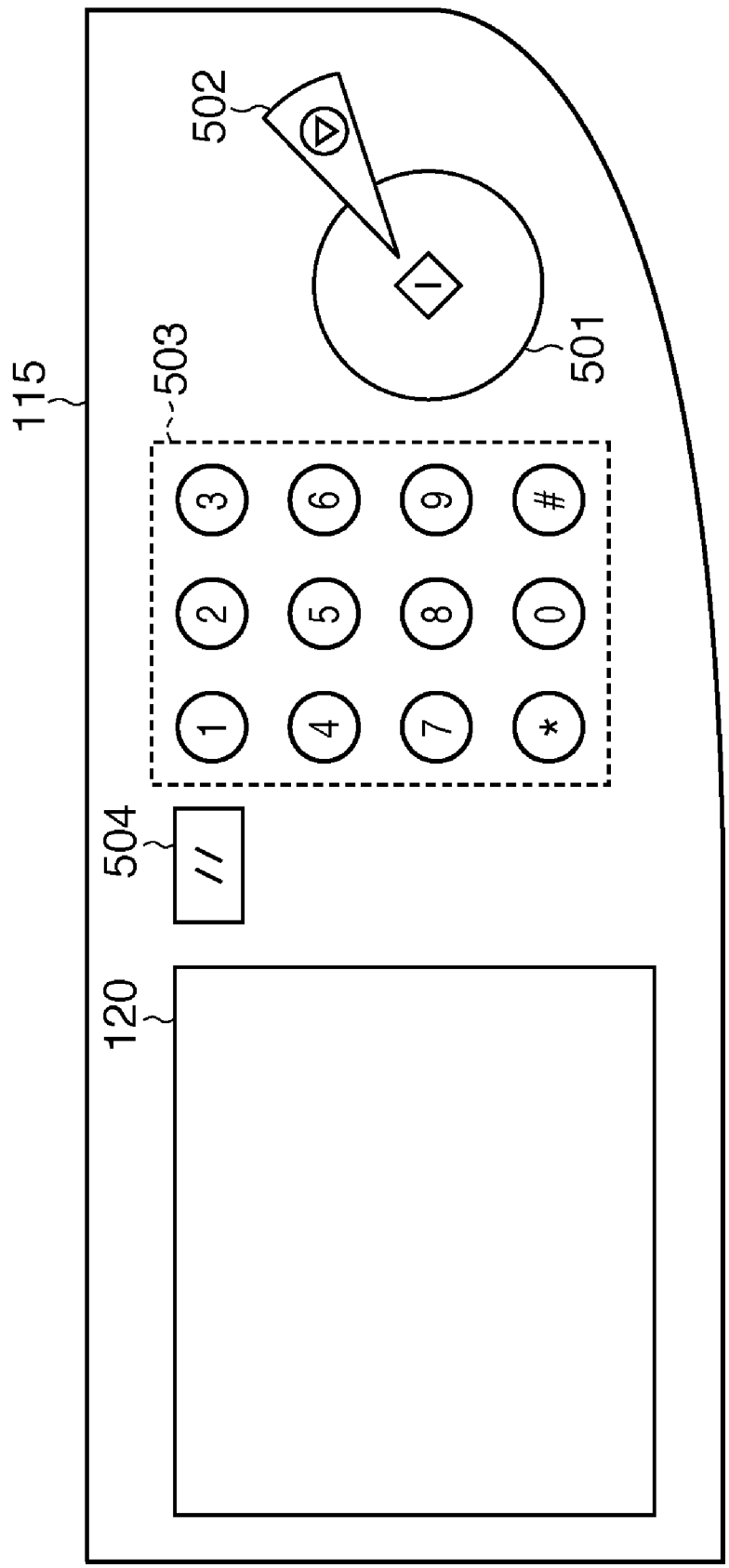
FIG. 2 shows an exemplary configuration of an operation unit 115 according to the first embodiment.

Next, the operation unit 115 according to the present embodiment will be described in detail with reference to FIG. 2. FIG. 2 shows an exemplary configuration of the operation unit 115 according to the first embodiment. While a configuration in which the operation unit 115 and the display unit 120 are integrated will be described here, the present invention is not limited to this configuration. That is, the operation unit 115 and the display unit 120 may be disposed separately within the printer 101.

The operation unit 115 is constituted by a start key 501, a stop key 502, a numeric keypad 503, a reset key 504, and the display unit 120. The start key 501 is a hardware key for inputting a copy or scan job start. The stop key 502 is a hardware key for canceling a job currently being executed. The numeric keypad 503 consists of hardware keys used for numeric input or dialing when faxing. The reset key 504 is a hardware key for returning the operation setting to an initial value. The display unit 120 displays various types of setting information. Note that according to the present embodiment, a touch panel LCD (liquid crystal display) that enables the user to select operational modes or the like is applied to the display unit 120 as an example. The printer 101 receives transfer settings desired by the user using the operation unit 115, when transferring image data to another apparatus.

Figure 3:
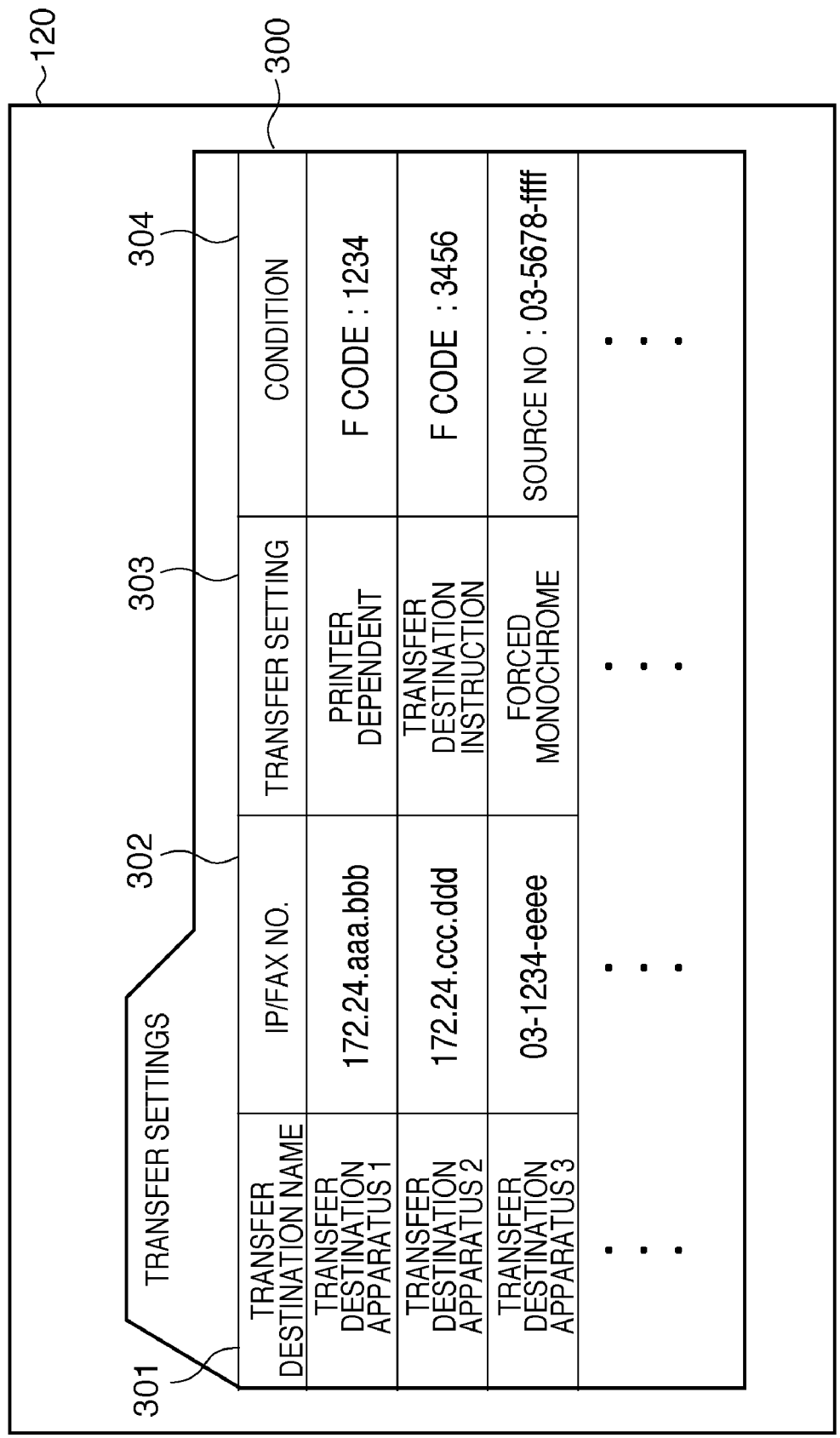
FIG. 3 shows a transfer setting screen 300 displayed on a display unit 120 according to the first embodiment.

Next, control performed when the printer 101 transfers received image data to the transfer destination printers 102 and 103 will be described with reference to FIGS. 3 to 6C. FIG. 3 shows a transfer setting screen 300 displayed on the display unit 120 according to the first embodiment.

The transfer setting screen 300 settably displays items such as a transfer destination name 301, an IP/fax number 302, a transfer setting 303, and a condition 304. In the transfer destination name 301 is displayed an item for setting a transfer destination apparatus name as information enabling a transfer destination apparatus to be specified. This merely needs to be usable in identifying a transfer condition, and information other than that capable of specifying an apparatus can be used. In the IP/fax number 302 is a displayed an item for setting an IP address or a fax number for communicably connecting to a transfer destination apparatus. If connection to a transfer destination apparatus is by another method, another address such as an email address may be used. In the transfer setting 303 is displayed an item for setting instruction information that instructs a transfer method for when transferring color image data to a transfer destination apparatus. Methods other than these may be set and image data transferred in accordance with the set method. In the condition 304 is displayed an item for setting a transfer setting condition, in the case where transfer settings are set based on an F-code, a password, a fax transmission source telephone number or the like. If the receiving unit is other than a fax, a condition corresponding to that receiving unit can be set.

Items displayed on the above display unit 120 operate as soft keys on the touch panel. Accordingly, the user, by pressing these items, is able to change or add to content that has been set. The printer 101 thus displays the transfer setting screen 300 on the display unit 120 and allows the user to set transfer conditions. The CPU 114 identifies the set transfer conditions, based on information input via the transfer setting screen 300.

If, for example, a fax communication image that includes the F-code "1234" is received in the case where settings such as shown in FIG. 3 are set, the printer 101 transfers the received image data with "Printer Dependent" to the transfer destination apparatus 1. If image data that has a transfer instruction command to transfer to an apparatus with the IP address 172.24.aaa.bbb is received, for example, the printer 101 transfers the received image data with "Printer Dependent" to the transfer destination apparatus 1.

Figure 4:
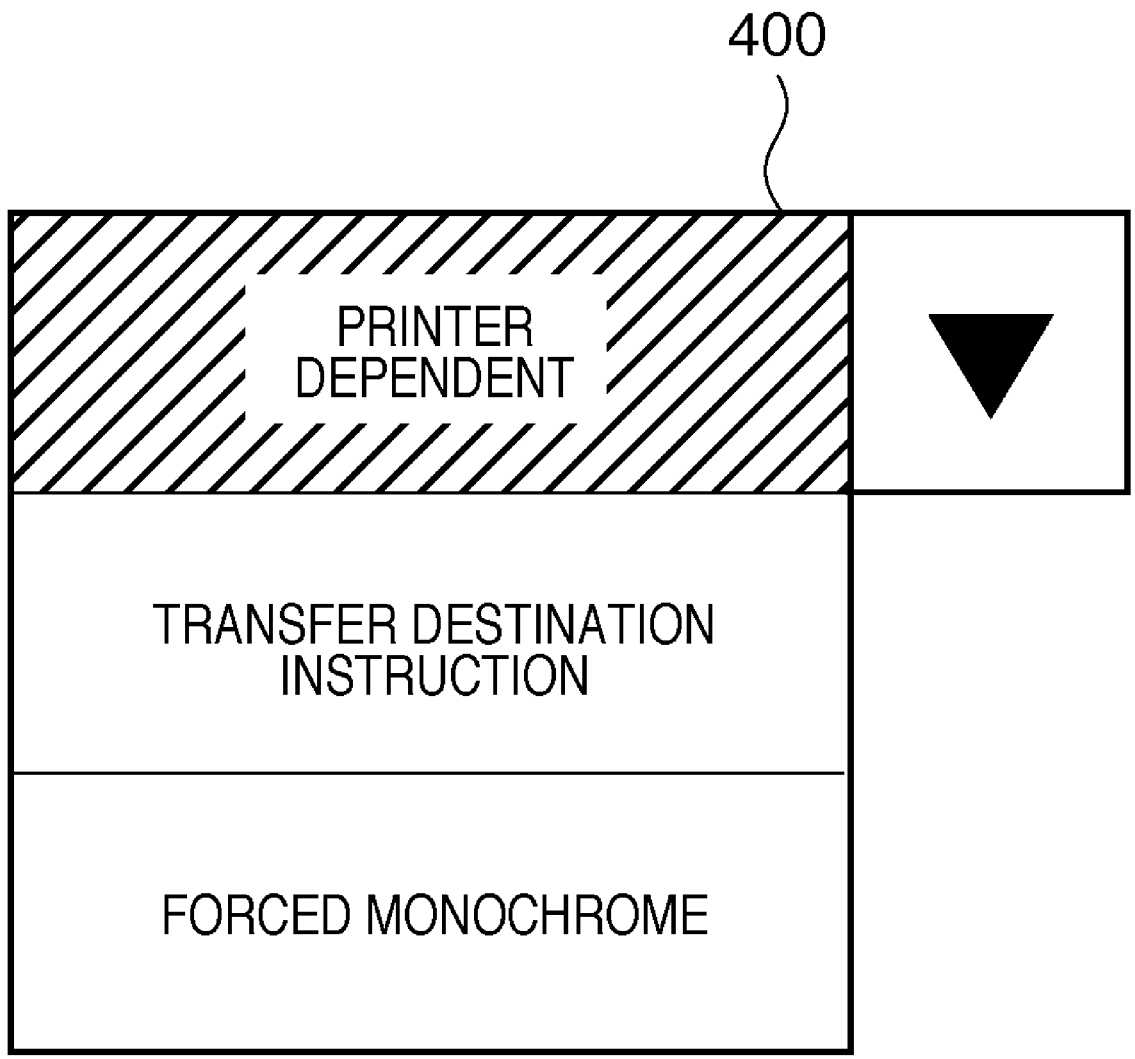
FIG. 4 shows a selection menu 400 according to the first embodiment.

Next, the instruction information "Printer Dependent", "Transfer Destination Instruction" and "Forced Monochrome" on the transfer setting 303 will be described with reference to FIG. 4. FIG. 4 shows a selection menu 400 according to the first embodiment. If the position of "Printer Dependent" shown in FIG. 3 is pressed by the user, for example, the printer 101 displays the selection menu 400 shown in FIG. 4 for setting instruction information. The user sets instruction information via this selection menu 400. In the present embodiment, "Printer Dependent", "Transfer Destination Instruction" and "Forced Monochrome" are provided as transfer settings (instruction information).

"Printer Dependent" indicates dependence on the transfer destination, and to accommodate the capacity of the transfer destination printer. For example, if the received image is a color image, and the transfer destination apparatus can print in color, the printer 101 transfers color image data to the transfer destination printer. Accordingly, "Printer Dependent" cannot be set for a transfer destination printer that can only print in monochrome. Alternatively, even if "Printer Dependent" could be set, the printer 101 would transfer monochrome image data obtained by converting the color image to a monochrome image, in accordance with the capacity of the transfer destination printer.

"Forced Monochrome" indicates a setting in which the printer 101 forcibly converts color image data to monochrome image data and transfers the monochrome image data when the received image is a color image, regardless of whether the transfer destination printer can print in color. "Transfer Destination Instruction" indicates a setting in which the printer 101 constituting the transfer source apparatus transmits, to the transfer destination printer, a report indicating that the image to be transferred is color, and appended with information on the printer 101. Further, the image data is stored in the storage unit 113. The user of the transfer destination printer that receives this report is able to select for him or herself whether to print in color or in monochrome.

Figure 5:
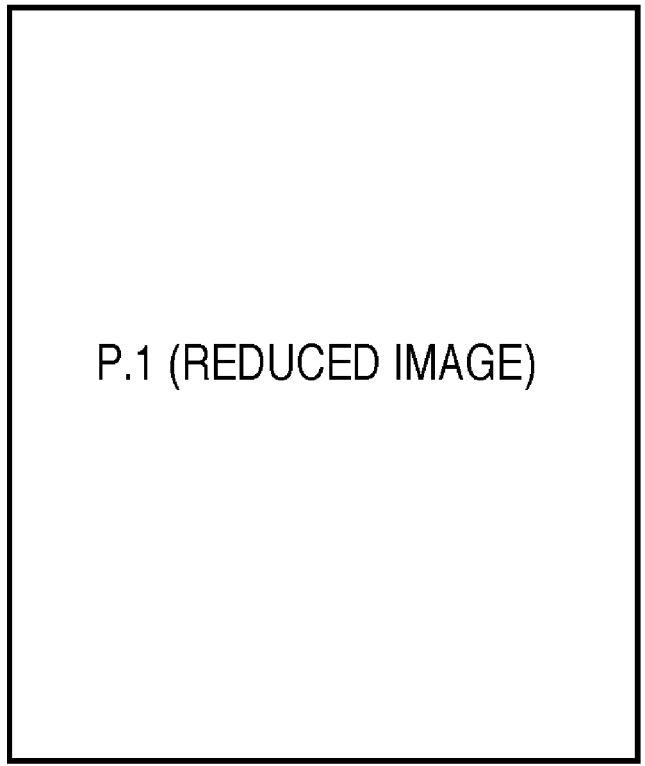
FIG. 5 shows a report 500 presented to a user when saving a color image according to the first embodiment.
Figure 6A:
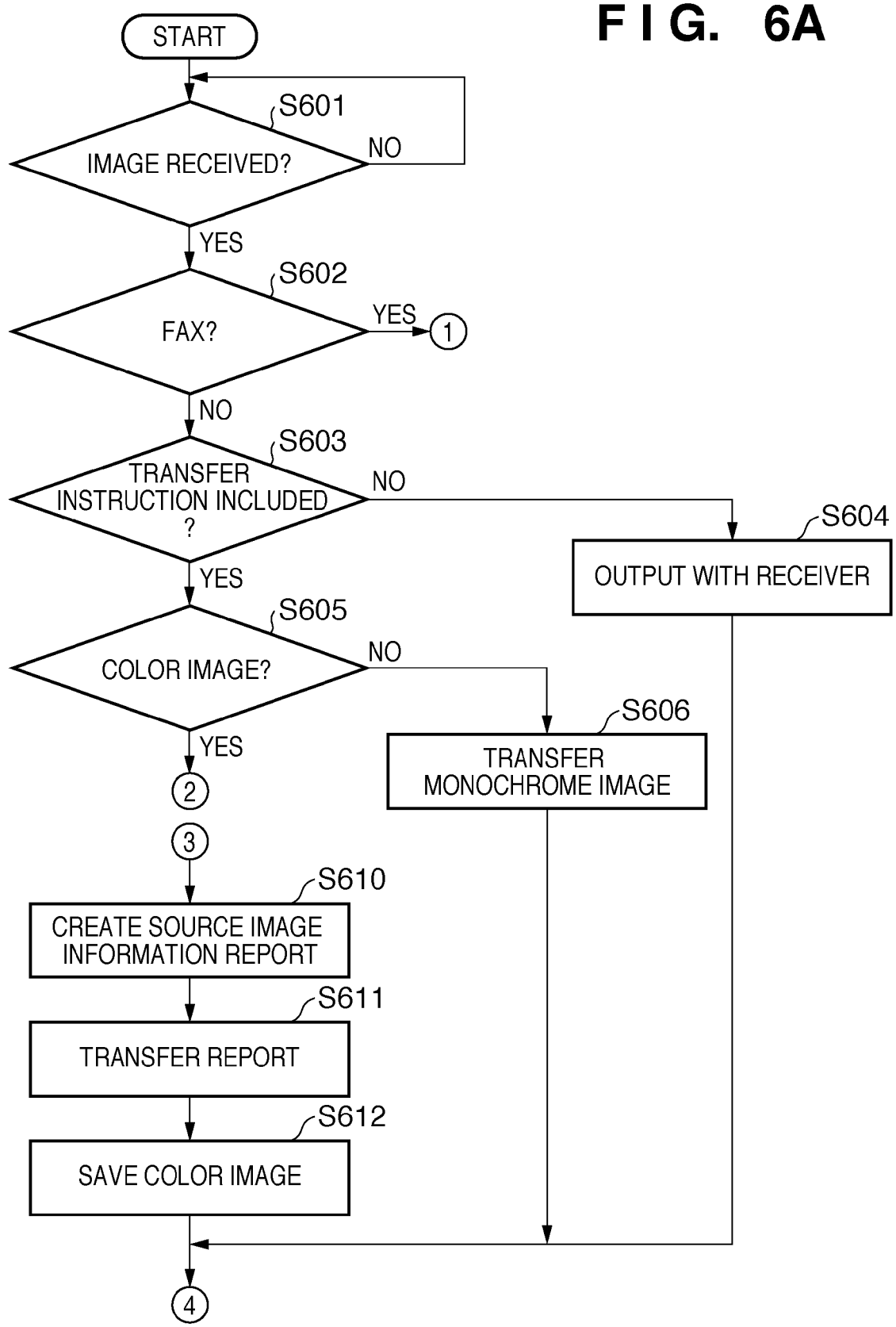
FIGS. 6A-6B are flowcharts showing a control procedure of a transfer process according to the first embodiment.
Figure 6B:
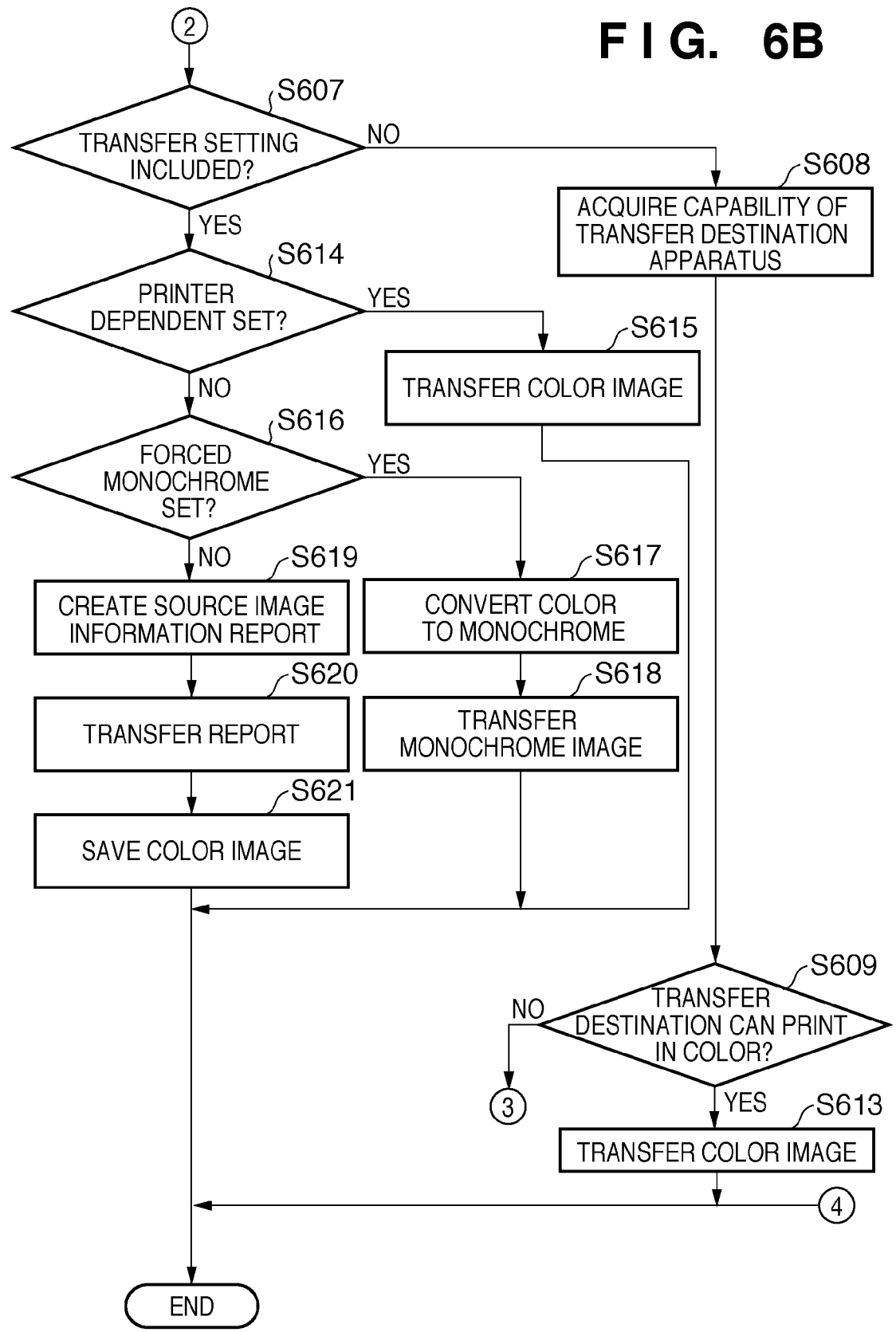
Figure 6C:
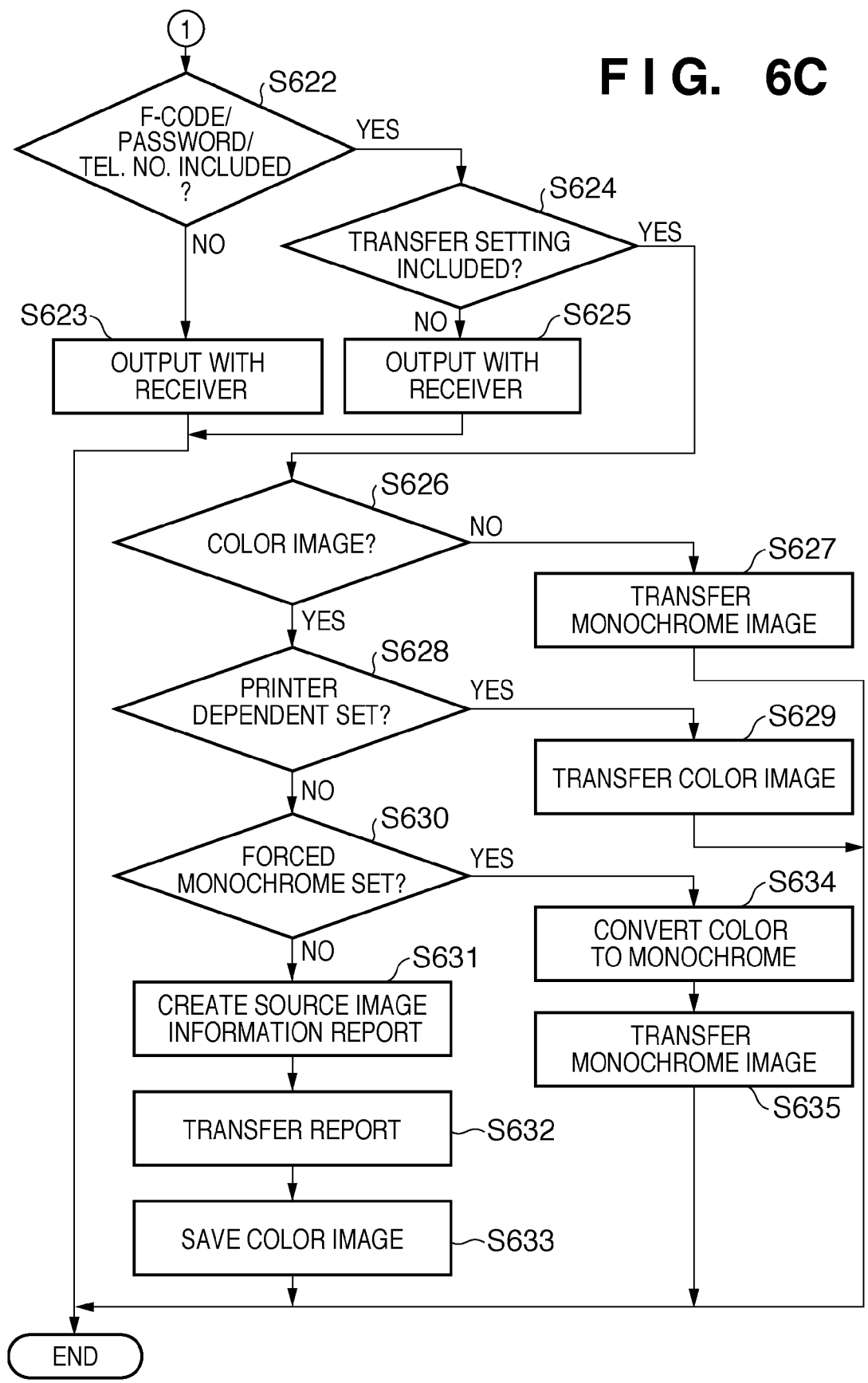
FIG. 6C is a flowchart showing a control procedure of a transfer process according to the first embodiment.

Next, control of the transfer process according to the present embodiment will be described with reference to FIGS. 5 to 6C. FIG. 5 shows a report presented to the user when saving a color image according to the first embodiment. FIGS. 6A, 6B and 6C are flowcharts showing a control procedure of the transfer process according to the first embodiment. First, the control procedure will be described in line with the flowcharts of FIGS. 6A, 6B and 6C. The processing that will now be described is performed under the overall control of the CPU 114.

In step S601, the CPU 114 waits to receive various data including image data from the communication line 106. When image data is received, the CPU 114, in step S602, determines whether the received image data is a fax communication. Specifically, the CPU 114 determines whether the received image data is a fax communication, by judging whether the image data was received via the PSTN 104 or via the network 105. If a fax communication, the CPU 114 shifts the processing to S622 shown in FIG. 6C. The processing in the case of the received image data being a fax communication will be described below using FIG. 6C. On the other hand, if not a fax communication, the CPU 114 shifts the processing to S603.

In step S603, the CPU 114 determines whether a transfer instruction command is included in the data received via the network 105. If a transfer instruction command is not included in the received data, the CPU 114 shifts the processing to S604, and executes printing in accordance with the received image data from the printer unit 112. On the other hand, if a transfer instruction command is included in the received data, the CPU 114 shifts the processing to S605. Accordingly, the processing from S605 onwards is a transfer process of transferring image data to another printer such as the printer 102 or 103.

In step S605, the CPU 114 determines whether the received image data is color or monochrome. Here, if monochrome, the CPU 114, in step S606, transfers the image data to the transfer destination printer without conversion, and ends the processing. On the other hand, if a color image, the CPU 114 shifts the processing to S607.

In step S607, the CPU 114 determines whether a transfer setting 303 that includes information on the transfer method of the color image is set for the instructed transfer destination. Here, if a transfer setting 303 is not set, the CPU 114 shifts the processing to S608. On the other hand, if a transfer setting 303 is set, the CPU 114 shifts the processing to S614.

If a transfer setting 303 is not set, the CPU 114, in step S608, acquires capability information on the transfer destination printer using the capability exchange unit 119, having established a communication connection with the transfer destination printer. Subsequently, in step S609, the CPU 114 determines whether the transfer destination printer can print in color, based on the received capability information on the transfer destination printer. Here, the description relates to information showing whether color printing is available, out of the capability information on the transfer destination. However, the capability information may include other information, rather than being limited only to this information. If color printing is available, the CPU 114, in step S613, transfers the color image data to the instructed transfer destination printer, and ends the processing. On the other hand, if color printing is not available, the CPU 114 shifts the processing to S610.

In step S610, the CPU 114 creates a one page report 500 that includes at least information that the image to be transferred is a color image and information on the printer 101 serving as the transfer source apparatus. Here, the setting of the transfer setting 303 will be "Transfer Destination Instruction". An exemplary report 500 is shown in FIG. 5. Subsequently, in step S611, the CPU 114 transmits the created report 500 to the transfer destination printer. Further, in step S612, the CPU 114 saves the received color image data in the storage unit 113, and ends the processing.

If it is determined in S607 that a transfer setting 303 is set, the CPU 114, in step S614, determines whether the setting content of the transfer setting 303 is "Printer Dependent". If the setting content is "Printer Dependent", the CPU 114, in step S615, transfers the received color image data to the transfer destination printer without converting the image data, and ends the processing. On the other hand, if the setting content is not "Printer Dependent", the CPU 114, in step S616, determines whether the setting content is "Forced Monochrome".

If the setting content is "Forced Monochrome", the CPU 114, in step S617, converts the color image data to monochrome image data with the color-to-monochrome conversion unit 117. Then, in step S618, the CPU 114 transfers the monochrome image data to the transfer destination printer, and ends the processing.

On the other hand, if it is determined at S616 that the setting content is not "Forced Monochrome", the CPU 114, in step S619, determines that "Transfer Destination Instruction" is set in the transfer setting 303, and creates a report 500 in monochrome similarly to S610. Then, in step S620, the CPU 114 transmits the created report 500 to the transfer destination printer. Further, in step S621, the CPU 114 saves the received color image data in the storage unit 113, and ends the processing.

Following on, the case where it is determined in the above S602 that the received image data is a fax communication will be described with reference to FIG. 6C.

If the received image data is a fax communication (i.e., if received via PSTN 104), the CPU 114, in step S622, determines whether an F-code, a password and the telephone number of the transmission source are included in the received data. If they are not included in the received data, the CPU 114, in step S623, determines that the received data is an output command to the receiver (i.e., here, printer 101), and prints the received image data. On the other hand, if it is determined that they are included in the received data, the CPU 114 shifts the processing to S624.

In step S624, the CPU 114 determines whether a transfer setting 303 is included in the received data. If a transfer setting 303 is not included, the CPU 114, in step S625, determines that received data is an output command to the receiver (i.e., here, printer 101), and prints the received image data. On the other hand, if a transfer setting 303 is included, the CPU 114 shifts the processing to S626.

In step S626, the CPU 114 determines whether the received data is a color image. If not a color image, the CPU 114, in step S627, transfers the monochrome image data constituting the received data as is to the transfer destination printer, and ends the processing. On the other hand, if a color image, the CPU 114 shifts the processing to S628. Note that description of the processing of steps S628 to S635, being similar to the processing of steps S614 to S621, will be omitted.

Here, the report 500 transmitted to the transfer destination when saving color image data will be described in detail with reference to FIG. 5. When saving color image data, the CPU 114 saves the color image data in the storage unit 113 after appending a unique number or name. Further, the CPU 114 adds information indicating the unique number or name to the report 500, as shown in FIG. 5.

The report 500 includes content indicating that a color image has been received, information related to the printer 101, the number or name information of the color image saved in the printer 101, and a monochrome image of the first page of the image data. The user who receives this report 500 is able to specify the printer 101, and can obtain the image data in a desired state with the number or name as an ID.

For example, the user is able to input the number or name using the printer 101, select color printing or monochrome printing, and execute printing. Alternatively, the user is also able to have the color image data converted to monochrome image data and have the monochrome image data transferred. Further, the user can also request the printer 101 to retransfer to another printer that can print in color. Here, the user may log in to the printer 101 from the transfer destination printer via the communication line 106, and input the number or name of the data to initiate the above processing. Alternatively, the user may move to where the printer 101 is situated, and input the number or name of the data to initiate the above processing.

As described above, the image processing apparatus allows a user to set instruction information for instructing a transfer method of image data, and decides on a transfer method based on the set instruction information if the image data is color data. These transfer methods include a first transfer method, a second transfer method, and a third transfer method. Specifically, the first transfer method involves transferring color image data. The second transfer method involves converting color image data to monochrome image data, and transferring the monochrome image data. The third transfer method involves storing color image data in a storage unit and transmitting a report showing that image data has been received to the transfer destination printer. The image processing apparatus is thereby able to provide a wide range of options to the user in terms of transfer methods for transferring image data. For example, even if color printing is available in the transfer destination apparatus, the image processing apparatus is able to convert the color image data to monochrome image data and transfer the monochrome image data, if the user wants monochrome printing. Also, even if color printing is not available in the transfer destination apparatus, the image processing apparatus is able to save the color image data internally, and notify the user that color image data has been received, if the user wants color printing.

Note that various modifications are possible with present invention, rather than being limited to the above embodiment. For example, if instruction information is not set, the image processing apparatus may acquire capability information on the transfer destination apparatus, and decide on a transfer method in accordance with the acquired capability information. If color printing was available in the transfer destination apparatus, for example, the image processing apparatus may decide on the above first transfer method as the transfer method. If color printing was not available in the transfer destination apparatus, the image processing apparatus may decide on the above third transfer method as the transfer method. The image processing apparatus is thus able to select a suitable transfer method even if instruction information is not set.

The image processing apparatus may be provided with a display control unit that causes a display apparatus provided in the image processing apparatus to display a setting screen for setting instruction information, and an acquisition unit that acquires the setting content input via the setting screen using an input apparatus provided in the image processing apparatus. In this case, the setting screen preferably includes at least an item for setting information for communicably connecting to the transfer destination apparatus and an item for setting the instruction information. The image processing apparatus is thus able to provide a user interface that enables the user to readily instruct a desired transfer method.

Second Embodiment

Figure 7:
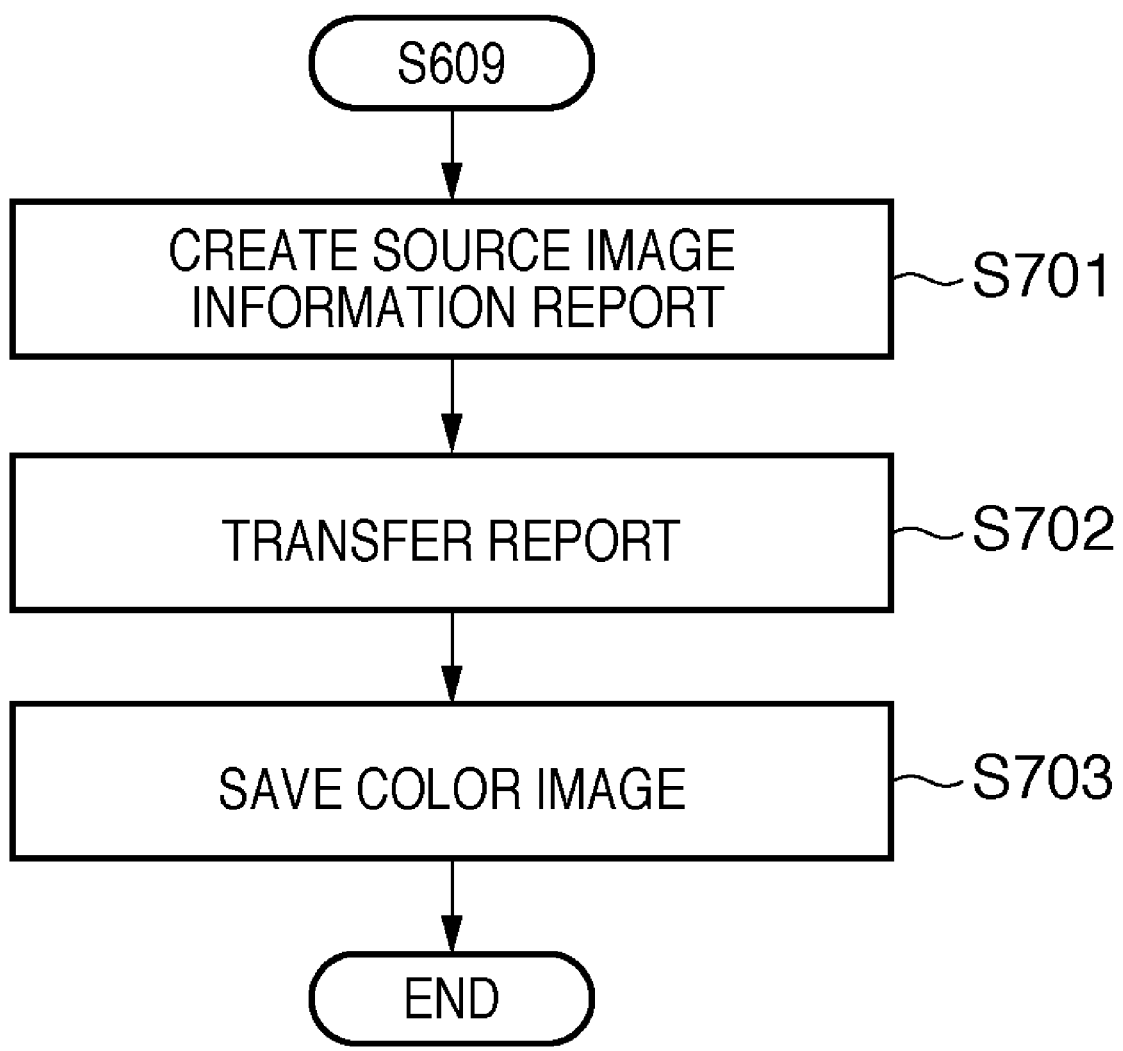
FIG. 7 is a flowchart showing a processing procedure for transferring image data according to a second embodiment.

Next, a second embodiment will be described with reference to FIG. 7. The present embodiment is a variation of S613 shown in FIG. 6B in the first embodiment. Specifically, the processing of S613 is processing performed in the case where instruction information is not set and color printing is available in the transfer destination printer. FIG. 7 is a flowchart showing a processing procedure for transferring image data according to the second embodiment. The processing described here is substituted for the processing of S613 shown in FIG. 6B. Accordingly, the processing in the present embodiment is similar to the first embodiment, apart from the processing that will now be described.

In the case where the capability information of the transfer destination shows that color printing is available at S609, the CPU 114, in step S701, creates a one page report 500 that includes at least information that the image to be transferred is a color image and information on the transfer source printer 101. Further, the report 500 is created with a monochrome image. Here, the CPU 114 functions as a report creation unit. Subsequently, in step S702, the CPU 114 transmits the created report 500 to the transfer destination printer. Further, in step S703, the CPU 114 saves the received color image data in the storage unit 113, and ends the processing.

Here, the description related to the selection of the third transfer method in the case where instruction information is not set and color printing is available in the transfer destination printer. Accordingly, if instruction information is not set, the third transfer method will be selected, regardless of whether color printing is available in the transfer destination printer. Therefore, the processing of S608 and S609 may be omitted in the present embodiment.

As described above, in the case where instruction information is not set, the image processing apparatus puts the transfer process on hold until an instruction from the user of the transfer destination relating to the transfer method is received, even if the transfer destination apparatus can print in color. The options for selecting a printing method desired by the user of a transfer destination in which instruction information is not set can thereby be broadened.

Other Embodiments

Next, other embodiments will be described with reference to FIGS. 8 and 9. Here, variations of the report 500 will be described. FIG. 8 shows a report 800 constituting a variation of the report 500. The report 800 includes monochrome images obtained by reducing the content of one or more pages of the received image data.

The report 800, similarly to the report 500, includes information that color image data has been received as image data, information for specifying the transfer source printer, and information for specifying the image data stored in the storage unit 113. Further, the report 800, different from the report 500, includes a plurality of pages worth of reduced images, rather than only a reduced image consisting of a monochrome image of one page worth of image data. While four pages worth of reduced images are shown as an example, the report 800 may include an arbitrary number of pages in accordance with the size of the report. Also, the report itself may be made up of a plurality of pages in order to include more information.

The first page image of a fax communication is often a cover sheet containing a fax address and the like, and the image information that is likely included from the second page onwards is not clearly visible. However, by including a plurality of pages of reduced images as with report 800, a number of images can be checked, enabling the user's decision as to whether or not color printing is necessary to be facilitated.

Figure 9:
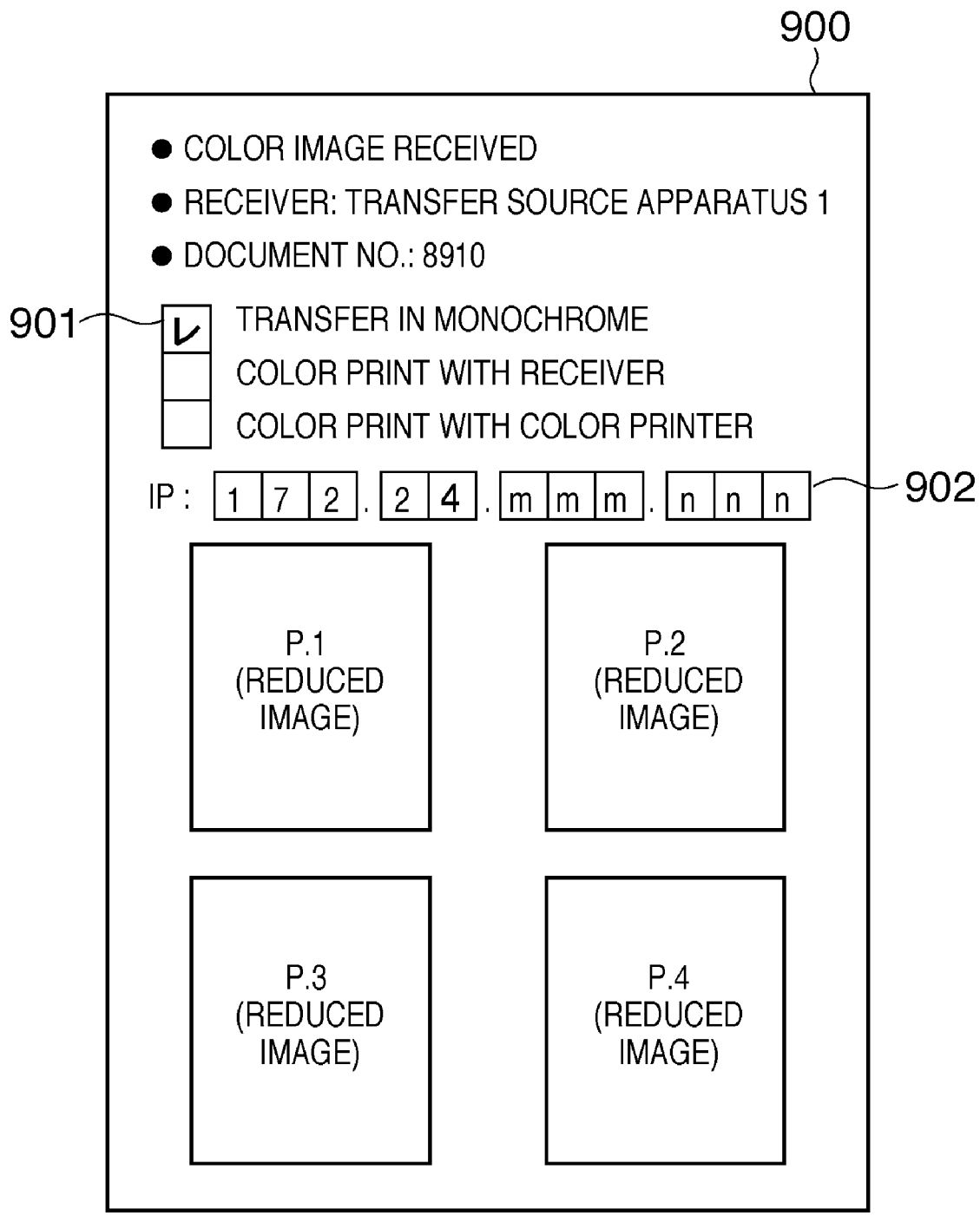
FIG. 9 shows a report 900 constituting a variation of the report 800.
Figure 10:
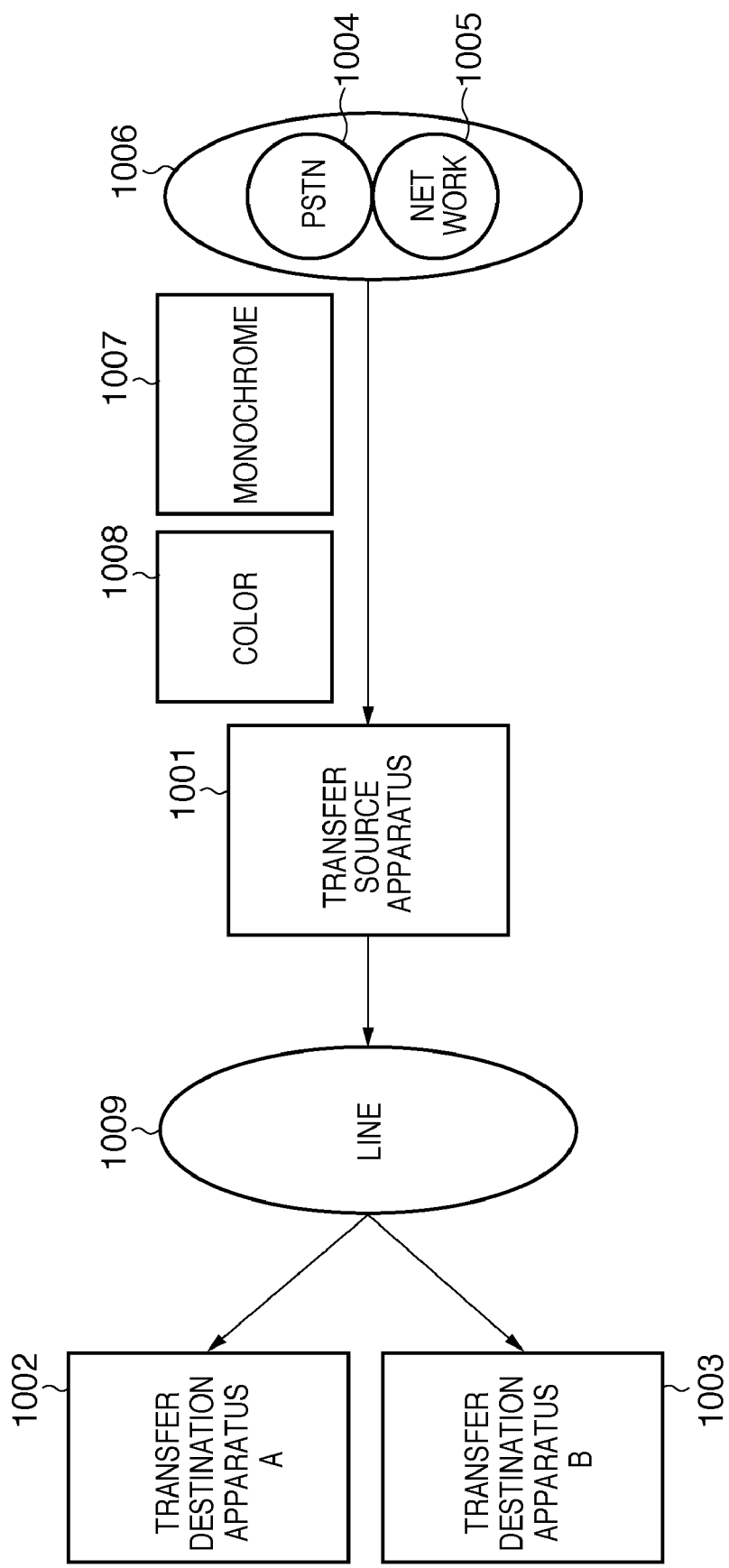
FIG. 10 shows a data flow when transferring image data.
Figure 11:
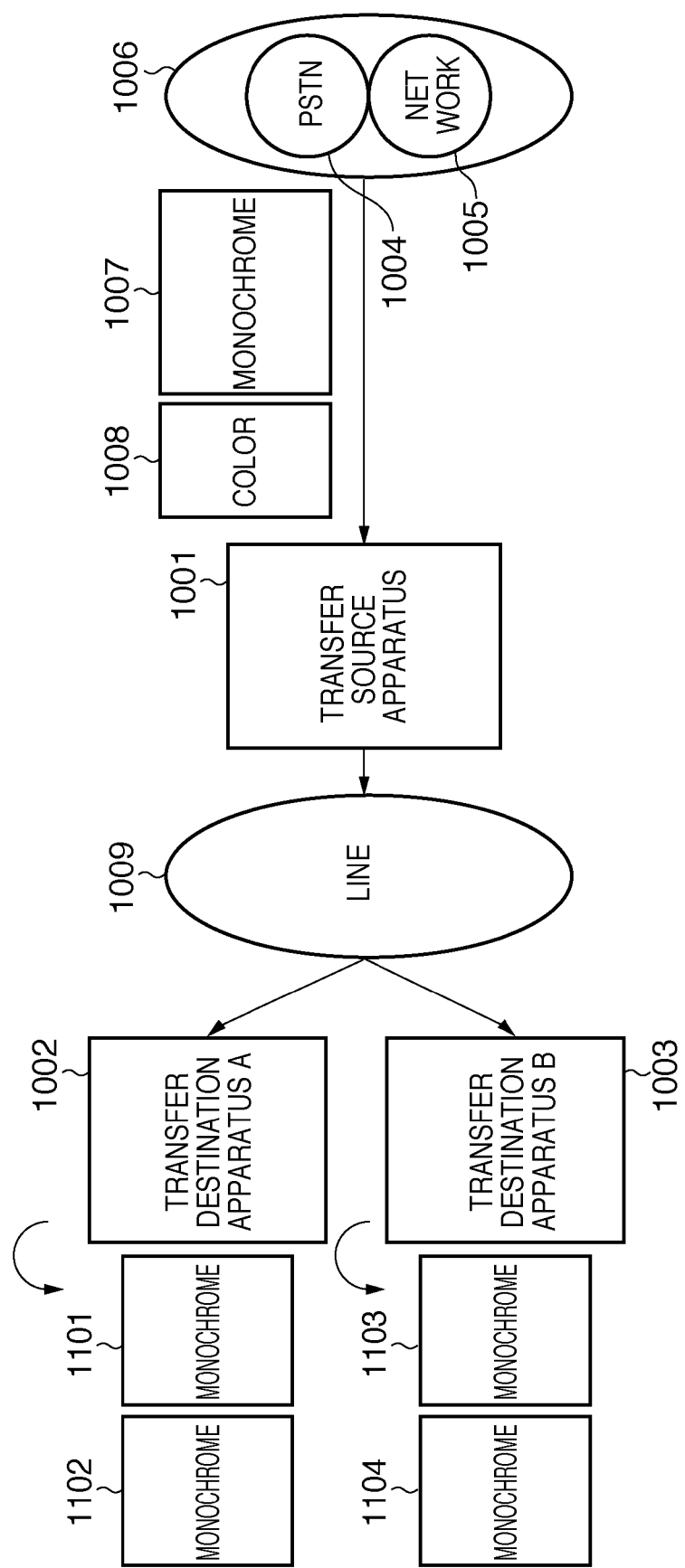
FIG. 11 shows a data flow when transferring image data.
Figure 12:
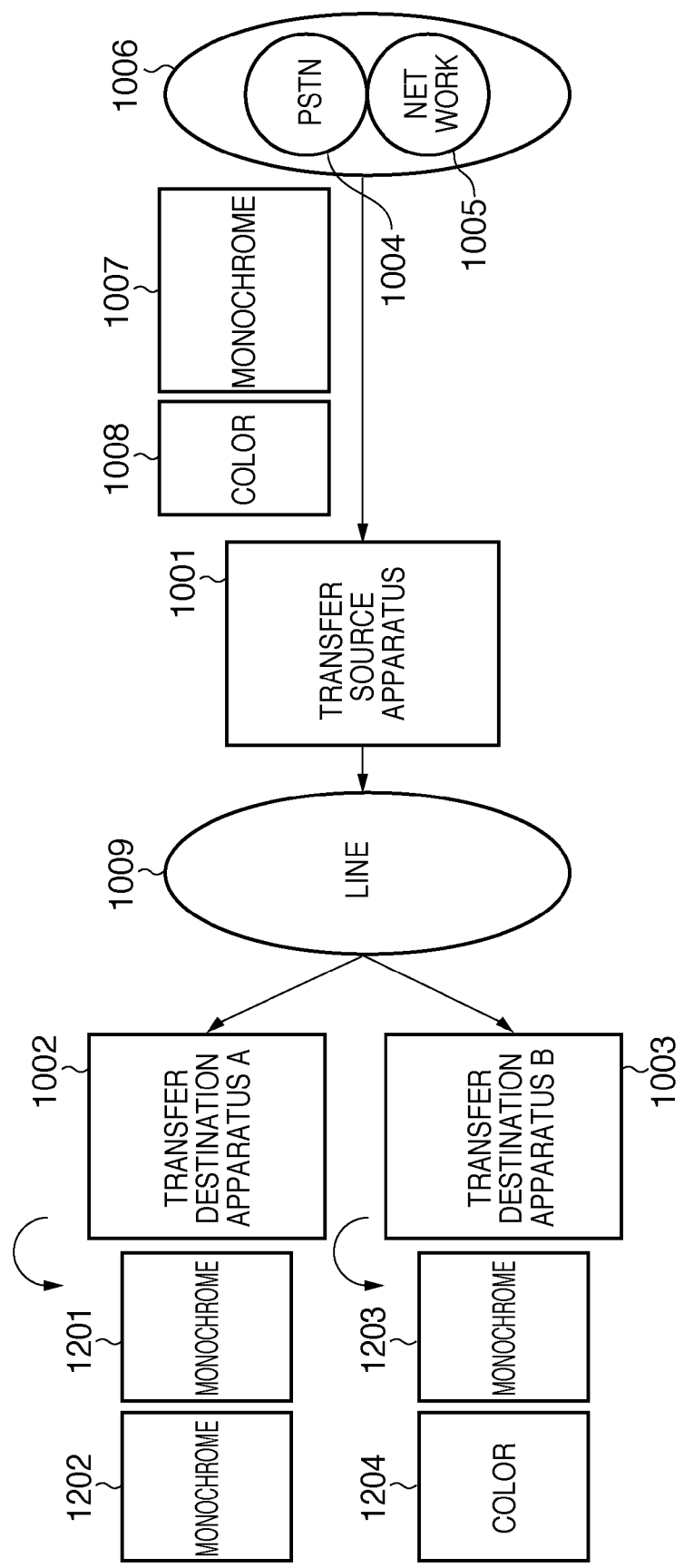
FIG. 12 shows a data flow when transferring image data.

FIG. 9 shows a report 900 constituting a variation of the report 800. The report 900 includes, in addition to the content of the report 800, selection items 901 that enable the transfer method of color image data to be selected. Further, an address entry area 902 that enables an IP address showing connection information of the transfer destination to be written is provided.

The selection items 901 are provided with check boxes, and a transfer method is selected by the user checking the checkbox of the desired transfer method. An area in which an address of the transfer destination to which the user wants to transfer the image data, such as an IP address, for example, can be entered is provided in the address entry area 902. The user is able to set the transfer destination by entering an IP address of the transfer destination, for example, in the address entry area 902.

Reading the report 900 in which entries have been made to a selection item 901 and the address entry area 902 with the scanner unit of the printer 101 or the transfer destination printer 102 or 103 enables the transfer method of color image data saved in the printer 101 to be decided on in the respective apparatus. If the report is read in the printer 101, control may be performed internally, and if the report is read in the transfer destination apparatus, an instruction command may be sent to the printer 101 serving as the transfer source apparatus via the communication line 109, based on a determination result.

This can be realized by detecting in the image processing unit 116 whether the checkbox of a selection item has been checked with a tick mark or the like, computing the coordinates of the detected position, and determining which operation has been selected. Here, the image processing unit 116 functions as an analysis unit.

As shown in FIG. 9, "Transfer in monochrome", "Color print with receiver" and "Color print with color printer", for example, are provided as the selection items 901. "Transfer in monochrome" is an item instructing the printer 101 to convert the color image data to monochrome with the color-to-monochrome conversion unit 117, and transfer the monochrome image data to the transfer destination printer. "Color print with receiver" is an item instructing the printer 101 to print out the color image data with the printer 101. "Color print with color printer" is an item instructing the printer 101 to transmit the color image data to a color printing enabled printer designated by the end user. Note that in this case, the user enters the address of the transfer destination printer in the address entry area 902. The image processing unit 116 of the printer that scanned the report acquires the address information by executing an OCR (optical character recognition) process on the address entry area 902, and notifies the printer 101 as necessary. Here, the image processing unit 116 functions as a character recognition unit. Transmitting the report 900 to the user of the transfer destination enables the task of obtaining an image desired by the end user to be facilitated.

Further, the information related to the printer 101 contained in the above report 900 and the document number or name information of the color image data saved in the printer 101 may be realized by a digital security code. A digital security code indicates an identifier in which information is provided where lines or dots are located, such as a 1D barcode, a 2D barcode, a digital marble or a digital watermark, for example.

In this case, the respective apparatus reads the report 900 with the scanner unit 111 and decodes the digital security code with the image processing unit 116. The respective apparatus is thereby able to acquire information related to the printer 101 and the document number or name information of the color image saved in the printer 101. Using a digital security code enables security to be provided against third parties, while reducing the recognition error rate of report content resulting from the OCR process.

While various embodiments have been detailed above, the present invention may be applied to a system constituted by a plurality of devices or an apparatus composed of a single device. Examples include a printer, a facsimile, a PC, or a computer system that has a server and a client.

The present invention can also be achieved by directly or remotely supplying a software program that realizes the functions of the foregoing embodiments to a system or an apparatus, and reading out and executing the supplied program code with a computer included in the system or apparatus.

Accordingly, the present invention is also realized by the actual program code installed on the computer, in order to realize the functions and processes of the present invention by computer. In other words, the actual computer program for realizing the above functions and processes is also one of the inventions.

In this case, the present invention may be in any program form such as object code, a program executed by an interpreter, script data supplied to an operating system, or the like, as long as the functions of the program are provided.

Storage media for supplying the program include flexible disk, hard disk, optical disk, magneto-optical disk, CD-ROM, CD-R, and CD-RW, for example. Magnetic tape, nonvolatile memory card, ROM, and DVD (DVD-ROM, DVD-R) may also be used as storage media.

The program may be downloaded from a website on the Internet using the browser of a client computer. That is, the actual computer program of the present invention or a compressed file including an auto-install function may be downloaded from the website to a storage medium such as a hard disk. The present invention can also be realized by dividing the program code constituting the program of the present invention into a plurality of files and downloading the respective files from different websites. In other words, a World Wide Web (WWW) server that allows a plurality of users to download program files for realizing the functions and processes of the present invention by computer may also be a constituent element of the present invention.

The program of the present invention may be distributed to users in encrypted form stored on a storage medium such as a CD-ROM. In this case, users that meet a prescribed requirement are allowed to download decryption key information from a website via the Internet, and to install the program on a computer by decrypting the encrypted program using this key information and executing the decrypted program.

The functions of the foregoing embodiments may be realized as a result of a computer executing the read program. Note that an operating system or the like running on a computer can perform part or all of the actual processing based on instructions in the program. The functions of the foregoing embodiments can, of course, be realized in this case.

Further, the program read out from the storage medium may be written to a memory provided in a function expansion board inserted in a computer or a function expansion unit connected to a computer. A CPU or the like provided in the function expansion board or the function expansion unit may perform part or all of the actual processing based on instructions in the program. The functions of the foregoing embodiments may also be thereby realized.

The present invention is able to provide an image processing apparatus that enables a user to widely select a desired transfer method, in relation to methods of transferring image data to be output to a transfer destination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-322542, filed on Dec. 13, 2007, which is hereby incorporated by reference herein in its entirety.

What is claimed is:

1. An image processing apparatus that receives image data and transfers the received image data to a transfer destination apparatus, the image processing apparatus comprising:

a setting unit configured to allow a user to set, for the transfer destination apparatus of the image data, instruction information for instructing a transfer method of the image data;

a storage unit configured to store the set instruction information;

a determination unit configured to determine whether the received image data is color image data or monochrome image data;

a decision unit configured to decide on the transfer method based on the instruction information stored in the storage unit, when the image data is color image data; and a transfer unit configured to transfer the image data in accordance with the decided transfer method; wherein the transfer method includes a first transfer method of transferring color image data, a second transfer method of converting the color image data to monochrome image data and transferring the monochrome image data, and a third transfer method of storing the color image data in the storage unit and transmitting a report showing that the image data has been received, to the transfer destination apparatus, wherein the instruction information is settable as a transfer destination dependent instruction for transferring the image data in accordance with a capability of the transfer destination apparatus, a forced monochrome instruction for forcibly converting the color image data to monochrome image data and transferring the monochrome image data, or a transfer destination instruction for allowing the user of the transfer destination apparatus to instruct the transfer method, and wherein the decision unit decides on the first transfer method as the transfer method if the transfer destination dependent instruction is set as the instruction information and color printing is available in the transfer destination apparatus, decides on the second transfer method as the transfer method if the transfer destination dependent instruction is set as the instruction information and color printing is not available in the transfer destination apparatus, decides on the second transfer method as the transfer method if the forced monochrome instruction is set as the instruction information, and decides on the third transfer method as the transfer method if the transfer destination instruction is set as the instruction information.

2. The image processing apparatus according to claim 1, wherein the decision unit comprises:

a capability acquisition unit configured to acquire, from the transfer destination apparatus, capability information showing whether color printing is available in the transfer destination apparatus, if the instruction information is not set, and decides on the first transfer method as the transfer method if the acquired capability information shows that color printing is available in the transfer destination apparatus, and decides on the third transfer method as the transfer method if the acquired capability information shows that color printing is not available in the transfer destination apparatus.

3. The image processing apparatus according to claim 1, wherein the decision unit decides on the third transfer method as the transfer method if the instruction information is not set.

4. The image processing apparatus according to claim 1, wherein the setting unit comprises:

a display control unit configured to cause a display apparatus provided in the image processing apparatus to display a setting screen for setting the instruction information; and an acquisition unit configured to acquire a setting content input via the setting screen using an input apparatus provided in the image processing apparatus, and the setting screen includes at least an item for setting information for communicably connecting to the transfer destination apparatus and an item for setting the instruction information.

5. The image processing apparatus according to claim 1, wherein the transfer unit comprises a report creation unit configured to create the report, and the report includes at least information that color image data has been received as the image data, information for specifying the image processing apparatus, and information for specifying the image data stored in the storage unit.

6. The image processing apparatus according to claim 5, wherein the report creation unit creates the report as monochrome image data, and the report created as the monochrome image data is printed in monochrome by the transfer destination apparatus.

7. The image processing apparatus according to claim 5, wherein the report further includes a monochrome image obtained by reducing at least one page of a content of the image data.

8. The image processing apparatus according to claim 5, wherein the report further includes a selection item for selecting the instruction information for instructing the transfer method, and the decision unit comprises:
 a read unit configured to read, as image data, a report in which the selection item has been selected by the user; and
 an analysis unit configured to acquire selected instruction information from the image data of the read report, by analyzing a position of the selection item, and
 decides on the transfer method based on the acquired instruction information.

9. The image processing apparatus according to claim 8, wherein the report further includes an address entry area for entering address information of the transfer destination apparatus, for instructing the transfer destination apparatus, and the decision unit further comprises:
 a character recognition unit configured to recognize a character entered in the address entry area from the image data of the read report, and
 decides on the transfer destination apparatus based on the recognized character.

10. The image processing apparatus according to claim 5, wherein the information for specifying the image processing apparatus included in the report is represented with a digital security code in which the information is provided at a location of a line or a dot.

11. A control method of an image processing apparatus that receives image data and transfers the received image data to a transfer destination apparatus, the method comprising:

allowing a user to set, for the transfer destination apparatus of the image data, instruction information for instructing a transfer method of the image data;

storing the set instruction information in a storage unit;

determining whether the received image data is color image data or monochrome image data;

deciding on the transfer method based on the instruction information stored in the storage unit, when the image data is color image data; and transferring the image data in accordance with the decided transfer method; wherein the transfer method includes a first transfer method of transferring color image data, a second transfer method of converting the color image data to monochrome image data and transferring the monochrome image data, and a third transfer method of storing the color image data in the storage unit and transmitting a report showing that the image data has been received, to the transfer destination apparatus, wherein the instruction information is settable as a transfer destination dependent instruction for transferring the image data in accordance with a capability of the transfer destination apparatus, a forced monochrome instruction for forcibly converting the color image data to monochrome image data and transferring the monochrome image data, or a transfer destination instruction for allowing the user of the transfer destination apparatus to instruct the transfer method, and wherein the decision unit decides on the first transfer method as the transfer method if the transfer destination dependent instruction is set as the instruction information and color printing is available in the transfer destination apparatus, decides on the second transfer method as the transfer method if the transfer destination dependent instruction is set as the instruction information and color printing is not available in the transfer destination apparatus, decides on the second transfer method as the transfer method if the forced monochrome instruction is set as the instruction information, and decides on the third transfer method as the transfer method if the transfer destination instruction is set as the instruction information.

12. A non-transitory computer-readable storage medium storing a computer-executable program, that when executed by a computer, causes the computer to perform the control method according to claim 11.

* * * * *